Patented June 3, 1941

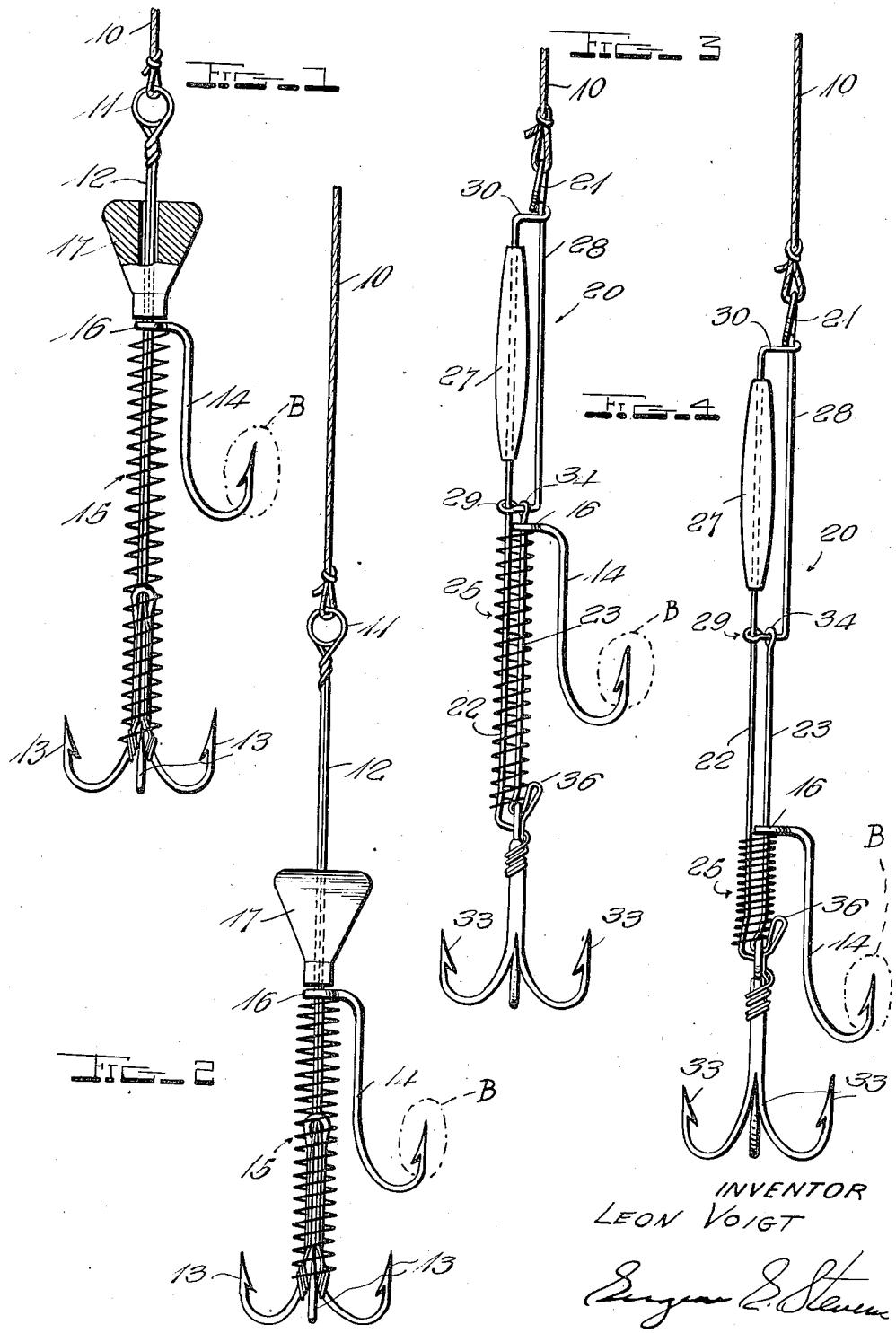

2,244,271

UNITED STATES PATENT OFFICE 2,244,271

TRAP HOOK

Leon Voigt, Galveston, Tex.

Application November 29, 1940, Serial No. 367,845

11 Claims. (Cl. 43—34)

My invention relates to hooks for catching fish, crabs, lobsters, and other aquatic life and relates more particularly to trap hooks wherein a bait hook cooperates with one or more snag hooks to securely hold the fish.

With the foregoing in view, an object of my invention is to provide an improved trap hook wherein a snag hook is provided with means connecting it with a line and on which is slidably mounted a bait hook and wherein means are provided to prevent the tangling of the two hooks.

A further object is to provide such a hook which has a weight or sinker carried by said leader above the bait hook.

A further object is to provide a trap hook wherein a bait hook is movable towards and away from a snag hook and which incorporates a compressive spring between the bait hook and the snag hook to normally "set" the trap hook and which spring comprises means to prevent tangling of the hooks.

A further object is to provide a snag hook having a leader, a compressive spring around said leader above said hook, and a bait hook slidable on said leader above said spring.

A further object is to provide a snag hook having a leader, a compressive spring around said leader above said hook, and a bait hook slidable on said leader above said spring, and a weight carried by said leader above said bait hook.

A further object is to provide a snag hook having a leader, a compressive spring around said leader above said hook, and a bait hook slidable on said leader above said spring, and a weight slidably mounted on said leader above said bait hook.

A further object is to provide a snag hook having a leader, a compressive spring around said leader above said hook, and a bait hook slidable on said leader above said spring, and a sinker fixedly attached to said leader above said bait hook.

A further object is to provide a snag hook rigidly connected to a substantially rigid connecting means and a bait hook slidable on said connecting means.

In the drawing:

Fig. 1 is an elevation of my improved trap hook showing the same in the set position; a part being shown in section and a part being shown diagrammatically.

Fig. 2 is an elevation of Fig. 1, but showing the device in the sprung position;

Figs. 3 and 4 are views corresponding to Figs. 1 and 2, respectively, but showing a modified form of the invention.

Referring particularly to the form of invention of Figs. 1 and 2, 10 designates the lower end of a fishing line which is suitably secured to the eye 11 formed on the upper end of an elongated leader 12 which is preferably formed of relatively stiff wire. The shank of a snag hook 13 is rigidly secured to the lower end of the leader 12. The eye 16 of a bait hook 14 is bent at right angles to the shank of the bait hook and is slidable on the leader 12. Interposed between the bait hook 14 and the snag hook 13 is a compressive coil spring 15 shown diagrammatically in all figures. A weight or sinker 17 may be freely slidable on the leader 12 above the bait hook 14. It is to be understood that the spring 15 is just strong enough to maintain the bait hook 14 and sinker 17 in the Fig. 1 position under normal conditions. The snag hook proper comprises a fixed abutment for the lower end of the spring while the eye 16 is a movable abutment for the upper end of the spring. In operation, when the fish nibbles or takes the bait B, a jerk causing the snag hook 13 to move towards the bait hook to snag the fish or the running of the fish with the bait causes the bait hook 14 to move to the Fig. 2 position whereby the fish is snagged by the snag hooks 13. In the first instance, the inertia of the sinker prevents immediate transmittal of the movement of the snag hook to the bait hook. If the fish escapes without being snagged, the spring 15 returns the bait hook to the Fig. 1 position. Tangling of the bait hook 14 with the snag hooks 13 is prevented by the spring 15 which is of such a length relative to the bait hook 14 that when it is fully compressed, as in Fig. 2, the bait hook cannot reach the snag hook.

The modification shown in Figs. 3 and 4 differs from the structure of the Fig. 1 and 2 form in that instead of the simple leader 12, I have provided a rigid frame 20 having an eye 21 at the upper end for attachment to a fishing line and including parallel leader members 22 and 23 and 28—the eye 21 being formed at the upper end of the member 28. The lower end of the member 28 is laterally extended as at 29 and suitably engaged with a medial portion of the member 22 which is of a length substantially equal to that of the members 23 and 28 combined. The upper end of the member 22 is laterally directed as at 30 and is suitably secured to the member 28 just below the eye 21. That portion of the member 22 between the laterally directed part 30 and the laterally directed end 29 of the member 28, rigidly mounts a sinker 27 thereon which may be of any suitable form.

The member 23 is substantially aligned with the member 28 and has an upper end 34 suitably secured to the laterally extending part 29 of the member 28. The lower end of the member 23 may be doubled upon itself and then upwardly bent to form a hook 36 for the eye 32 of the snag hook 33. The lower end of the adjacent member 22 is laterally directed towards the hook 33 and the terminal portion, together with the terminal portion of the member 23 is wrapped or otherwise secured to the shank of the hook 33 whereby to form a rigid assembly of the members 22, 23 and hook 33, with the member 23 in substantial alignment with the shank of the hook.

A bait hook 14, having a laterally bent eye 16 is slidably mounted on the member 23 and is normally maintained in the Fig. 3 position by the upper end of a coil spring 25 which surrounds the lower end of the member 22 and the adjacent member 23. The hooked end 36 comprises a stop or abutment for the spring at the lower end of the frame and the laterally extended part 29 forms an abutment for the spring at the upper end of its frame. As in the first described form of the invention, the spring 25 is of such a length relative to the shank of the bait hook 14 that when the spring is fully compressed, the bait hook cannot tangle with the snag hook 33. The device operates in the same manner as does the first described form of the invention.

While I have shown a sinker in each form of the invention, it is to be understood that the same can sometimes be eliminated without materially changing the mode of operation of the device.

While I have shown and described what are now thought to be the preferred embodiments of my invention, it is to be understood that the same is susceptible of other forms and expressions and that I do not limit myself to the precise structure shown and described except as hereinafter claimed.

I claim:

1. A trap hook, comprising a snag hook, means connecting said hook to a fishing line, a bait hook slidable on said connecting means from a point remote from said snag hook to a point adjacent said snag hook, and compressive resilient means interposed between said hooks and normally maintaining said bait hook remote from said snag hook, said resilient means being so constructed as to prevent tangling of said hooks when said resilient means is fully compressed.

2. A trap hook, comprising a snag hook, a leader connected to said snag hook, a bait hook freely slidable on said leader from a point remote from said snag hook to a point adjacent said snag hook, and compressive resilient means carried by said leader between said hooks and normally maintaining said bait hook remote from said snag hook, said resilient means being so constructed as to prevent tangling of said hooks when said resilient means is fully compressed.

3. The structure of claim 2, said resilient means comprising a coil spring surrounding said leader.

4. The structure of claim 1, said compressive resilient means comprising a coil spring carried by said connecting means.

5. The structure of claim 2, and a sinker slidably carried by said leader above said bait hook and in engagement therewith to provide a weighted movable abutment for one end of said spring.

6. The structure of claim 1, said connecting means comprising a substantially rigid frame rigidly connected to said snag hook, said compressive resilient means comprising a coil spring, said spring and said bait hook being carried by a lower portion of said frame, said frame including rigid abutments for the opposite ends of said spring.

7. The structure of claim 2, said snag hook including a rigid shank, said leader being substantially rigid and being rigidly connected to said shank in substantially axial relation thereto, said compressive resilient means comprising a coil spring surrounding said shank and leader, said snag hook comprising a fixed abutment for one end of said spring, and said bait hook comprising a movable abutment for the other end of said spring.

8. The structure of claim 2, said snag hook including a rigid shank, said leader being substantially rigid and being rigidly connected to said shank in substantially axial relation thereto, said compressive resilient means comprising a coil spring surrounding said shank and leader, said snag hook comprising a fixed abutment for one end of said spring, said bait hook comprising a movable abutment for the other end of said spring, and a weight freely slidable on said leader above said bait hook and normally bearing against the same.

9. The structure of claim 1, said compressive resilient means comprising a coil spring surrounding said connecting means.

10. A trap hook, comprising a snag hook including a rigid shank, a rigid extension from said shank connecting said hook to a fishing line, a bait hook slidable on said extension from a point remote from said snag hook to a point adjacent the same, a compressive coil spring surrounding said shank and extension and separating said hooks, said snag hook comprising a fixed abutment for one end of said spring and said bait hook comprising a movable abutment for the other end of said spring.

11. The structure of claim 10, and a weight freely slidable upon said extension above said bait hook and normally bearing against the same.

LEON VOIGT.